UNITED STATES PATENT OFFICE 2,488,498

1,4-DI(ARYLOXY)-2-BUTENES

Clarence L. Moyle, Midland, Mich., assignor to The Dow Chemical Company, Midland, Mich., a corporation of Delaware No Drawing. Application September 13, 1948,
Serial No. 49,132

4 Claims. (Cl. 260—613)

This invention is directed to 1,4-di(aryloxy)-2-butenes having the formula

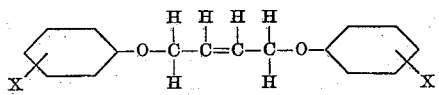

wherein X is a hydrocarbon radical of from 4 to 6 carbon atoms and selected from the group consisting of phenyl, cyclohexyl and alkyl radicals.

The new 1,4-di(aryloxy)-2-butenes are oils or crystalline solids, substantially insoluble in water and somewhat soluble in many organic solvents. They are valuable as constituents of insecticide compositions and as modifying agents in plastic compositions.

The new compounds may be prepared by reacting 1,4-dibromo-2-butene having the formula

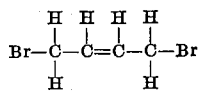

with an alkali metal phenolate substituted with a non-reactive substituent, such as phenyl, cyclohexyl or an alkyl radical having from 4 to 6 carbon atoms. The reaction may be carried out in an inert organic solvent and in the presence of a small quantity of water, if desired. One molecular proportion of 1,4-dibromo-2-butene is reacted with two molecular proportions of the phenolate, somewhat better yields being obtained when a small excess of the phenolate is employed. The reaction has been found to take place at a temperature of from 40° and 100° C.

In a representative preparation, 2 mols of sodium hydroxide is reacted with 2 mols of the substituted phenol in ethyl alcohol and a small amount of water to produce an alcoholic phenolate solution. 1 mol of 1,4-dibromo-2-butene is added portionwise to the above solution and the resulting mixture warmed for a short time at a temperature of from 40° to 80° C. to complete the reaction. The crude reaction product is then dispersed in a water-immiscible organic solvent, such as methylene dichloride, benzene or cyclohexane, and the resulting mixture successively washed with dilute aqueous sodium hydroxide and water, and dried over silica gel. The desired product is then separated by evaporation of the solvent.

The 1,4-dibromo-2-butene employed as a starting material is readily prepared by dissolving 1,3-butadiene in ethylene dichloride and reacting this solution with bromine at low temperatures. The desired product of reaction is obtained from the crude reaction mixture by conventional methods of purification, such as fractional distillation and fractional crystallization, and has a melting point of 53° C.

The following examples illustrate the invention but are not to be construed as limiting.

*Example 1.*—1,4-di(2-cyclohexylphenoxy)-2-butene

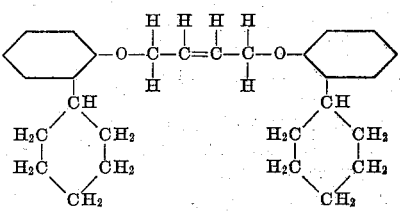

16.8 grams (0.42 mol) of sodium hydroxide was reacted with 74 grams (0.42 mol) of 2-cyclohexylphenol in 225 grams of ethyl alcohol and 25 grams of water to form a solution of the sodium salt of the phenol. 42.8 grams (0.2 mol) of 1,4-dibromo-2-butene was added portionwise to this solution and the resulting mixture warmed to the boiling temperature to complete the reaction. The crude reaction product was washed with dilute aqueous sodium hydroxide, the organic products of reaction extracted with methylene dichloride, and the solvent extract washed with water and dried over silica gel. The solvent was then removed by evaporation to obtain 1,4-di(2-cyclohexylphenoxy)2-butene as a brown oil having a density of 0.95 at 25° C.

*Example 2.*—1,4-di(4-cyclohexylphenoxy)-2-butene 16.8 grams (0.42 mol) of sodium hydroxide, 74 grams (0.42 mol) of 4-cyclohexylphenol and 42.8 grams (0.2 mol) of 1,4-dibromo-2-butene were reacted as described in Example 1 in 300 grams of ethyl alcohol and 30 grams of water. The crude reaction product was diluted with 20 grams of 50 per cent aqueous sodium hydroxide and the resulting mixture filtered. The residue from the filtering operation was then successively washed with ethyl alcohol, dilute aqueous hydrochloric acid and water, and thereafter dried to obtain 1,4-di(4-cyclohexylphenoxy)-2-butene as a crystalline solid melting at 144° to 146° C.

*Example 3.*—1,4-di(2-phenylphenoxy)-2-butene 8.0 grams (0.2 mol) of sodium hydroxide and 34 grams (0.2 mol) of 2-phenylphenol were reacted in 45 grams of ethyl alcohol and 10 grams of water. 21.4 grams (0.1 mol) of 1,4-dibromo-2-butene was added portionwise to this solution and the resulting mixture warmed for 15 minutes at 50° to 60° C. to complete the reaction. The crude product was then dispersed in methylene dichloride and the resulting mixture successively washed with dilute aqueous sodium hydroxide and water, and dried. The solvent was removed by evaporation to obtain 1,4-di(2-phenylphenoxy)-2-butene as an oily residue. The latter slowly solidified to form a white solid which was washed with hot butyl alcohol and found to have a melting point of 86° to 89° C.

*Example 4.—1,4-di(2-secondarybutylphenoxy)-2-butene*

12.0 grams (0.3 mol) of sodium hydroxide and 22.2 grams (0.3 mol) of 2-secondarybutylphenol were reacted in 75 grams of ethyl alcohol and 13 grams of water. 32 grams (0.15 mol) of 1,4-dibromo-2-butene was added portionwise to the above solution and the resulting mixture warmed for 30 minutes at 50° to 60° C. to complete the reaction. The crude product was then washed with dilute aqueous sodium hydroxide, and the organic products of reaction extracted with cyclohexane. The solvent extract was washed with a saturated aqueous solution of sodium chloride, filtered, and dried over silica gel. The solvent was then removed from the filtrate by evaporation to obtain 1,4-di(2-secondarybutylphenoxy)-2-butene as a residue. The latter was an orange oil having a density of 1.02 at 25° C.

In a similar manner other 1,4-di(aryloxy)-2-butenes may be prepared, of which the following are representative.

1,4-di(4-normalbutylphenoxy)-2-butene by reacting sodium 4-normalbutylphenolate with 1,4-dibromo-2-butene.

1,4-di(4-normalhexylphenoxy)-2-butene by reacting sodium 4-normalhexyphenolate with 1,4-dibromo-2-butene.

1,4-di(4-phenylphenoxy)-2-butene by reacting sodium 4-phenylphenol with 1,4-dibromo-2-butene.

To show the insecticidal activity of the new compounds, 60 parts by weight of 1,4-di(2-cyclohexylphenoxy)-2-butene, 10 parts of the dioctyl ester of sodium sulfosuccinic acid (a commercial wetting and emulsifying agent known as Aerosol OT) and 30 parts of xylene were mixed together. This composition was dispersed in water to form aqueous sprays containing various amounts of the toxicant. A 91 per cent kill of two-spotted spider mite and a 100 kill of bean aphids were obtained with this spray composition at a toxicant concentration of 2 pounds per 100 gallons of spray mixture.

I claim:

1. A 1,4-di(aryloxy)-2-butene having the formula

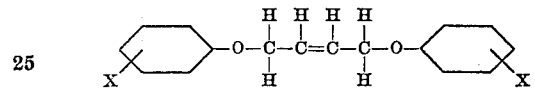

wherein X is a hydrocarbon radical of from 4 to 6 carbon atoms, inclusive, selected from the group consisting of phenyl, cyclohexyl and alkyl radicals.

2. 1,4-di(2-cyclohexylphenoxy)-2-butene.
3. 1,4-di(2-secondarybutylphenoxy)-2-butene.
4. 1,4-di(2-phenylphenoxy)-2-butene.

CLARENCE L. MOYLE.

No references cited.